(12) United States Patent
Iida

(10) Patent No.: US 9,357,338 B2
(45) Date of Patent: May 31, 2016

(54) COMMUNICATION DEVICE AND DETECTION METHOD

(71) Applicant: SONY CORPORATION, Tokyo (JP)

(72) Inventor: Sachio Iida, Chiba (JP)

(73) Assignee: SONY CORPORATION, Tokyo (JP)

( * ) Notice: Subject to any disclaimer, the term of this patent is extended or adjusted under 35 U.S.C. 154(b) by 53 days.

(21) Appl. No.: 14/305,282

(22) Filed: Jun. 16, 2014

(65) Prior Publication Data

US 2015/0004906 A1 Jan. 1, 2015

(30) Foreign Application Priority Data

Jun. 27, 2013 (JP) ................................ 2013-134749

(51) Int. Cl.
*H04B 5/00* (2006.01)
*H04W 4/00* (2009.01)
*H04W 12/12* (2009.01)
*G06F 21/44* (2013.01)
*G06F 21/55* (2013.01)

(52) U.S. Cl.
CPC ............. *H04W 4/008* (2013.01); *G06F 21/445* (2013.01); *G06F 21/556* (2013.01); *H04B 5/0043* (2013.01); *H04W 12/12* (2013.01); *G06F 2221/2111* (2013.01); *G06F 2221/2115* (2013.01); *G06F 2221/2119* (2013.01)

(58) Field of Classification Search
CPC ... H04W 4/008; H04W 5/0043; H04W 12/12; G06F 21/445; G06F 21/556; G06F 2221/2111; G06F 2221/2115; G06F 2221/2119
USPC .................. 455/41.1, 41.2, 41.3, 67.11, 509
See application file for complete search history.

(56) References Cited

U.S. PATENT DOCUMENTS

| | | | | |
|---|---|---|---|---|
| 7,460,842 B2 * | 12/2008 | Black | ................... | H03G 3/3042 455/127.1 |
| 7,551,140 B2 * | 6/2009 | Knadle, Jr. | ............ | B66F 9/0755 340/572.7 |
| 8,170,081 B2 * | 5/2012 | Forenza | ............... | H04B 7/0417 370/278 |
| 8,259,871 B2 * | 9/2012 | Hosokawa | ........... | H04B 7/0848 375/267 |
| 8,284,718 B2 * | 10/2012 | Yurugi | ................. | H04B 7/0851 370/328 |
| 8,334,728 B2 * | 12/2012 | Washiro | .................... | H01P 5/12 333/24 R |
| 8,457,551 B2 * | 6/2013 | Iida | .......................... | H04B 1/38 455/319 |
| 8,532,492 B2 * | 9/2013 | Palanisamy | ...... | H04B 10/25754 398/115 |
| 8,618,892 B2 * | 12/2013 | Iida | ......................... | H01P 1/213 333/112 |
| 8,654,815 B1 * | 2/2014 | Forenza | ............... | H04B 7/0626 375/141 |
| 2010/0156600 A1 * | 6/2010 | Duron | .................. | H01Q 1/2216 340/10.1 |
| 2013/0109305 A1 * | 5/2013 | Savoj | ............... | G06K 19/07749 455/41.1 |
| 2013/0335291 A1 * | 12/2013 | Judson | ..................... | H01Q 1/50 343/861 |

FOREIGN PATENT DOCUMENTS

JP 2006-221452 A 8/2006

* cited by examiner

*Primary Examiner* — Marceau Milord
(74) *Attorney, Agent, or Firm* — Chip Law Group

(57) ABSTRACT

There is provided a device including a communication device including a measurement portion configured to measure a reflection coefficient of an antenna that performs proximity wireless communication, during transmission of a transmission signal by the antenna, and a judgment portion configured to judge whether a value of the reflection coefficient measured by the measurement portion changes exceeding a value of a reflection coefficient of the antenna in a normal state and a predetermined threshold value.

11 Claims, 9 Drawing Sheets

COMMUNICATION DEVICE AND DETECTION METHOD

CROSS REFERENCE TO RELATED APPLICATIONS

This application claims the benefit of Japanese Priority Patent Application JP 2013-134749 filed Jun. 27, 2013, the entire contents of which are incorporated herein by reference.

BACKGROUND

The present disclosure relates to a communication device and a detection method.

Proximity communication in which wireless communication is performed by non-contact at a close distance of about several centimeters is utilized for an electronic commuter pass, electronic money, and the like, for example, and cellular phones having a function of an electronic commuter pass and electronic money utilizing the proximity communication have been increasingly widespread. The proximity communication is standardized as ISO/IEC 14443 and ISO/IEC 18092 (hereinafter also referred to as NFC (Near Field Communication)), for example.

Moreover, proximity communication at a transmission speed higher than that of the NFC has increasingly spread. As a communication method of such high-speed proximity communication, a proximity wireless communication method utilizing UWB (Ultra Wide Band) referred to as Transfer Jet (Registered Trademark), for example, is standardized as ISO/IEC 17568 and ISO/IEC 17569. In the TransferJet (Registered Trademark), 4.48 GHz carrier is adopted and proximity communication is performed at a transmission speed of 560 Mbps at the maximum.

By the use of the proximity wireless communication method, such as TransferJet, a high-speed data transfer is achieved between devices, such as digital cameras, PCs, and printers. In the proximity radio communication method employing such a proximity wireless communication method, the transmission electric power is reduced to intentionally limit the communication distance to a close distance of several centimeters to secure security, whereby a necessity of complicated security setup is eliminated to increase the user-friendliness.

The above-described proximity wireless communication system has been desired to have both simplicity for improving the user-friendliness and firm security. For example, in Japanese Patent Laid-Open No. 2006-221452 discloses a technique in which a mobile terminal having a authentication terminal having a short-distance wireless communication function and a detection function of detecting the authentication terminal present in a predetermined range is used, and the mobile terminal searches a nearby authentication terminal to perform personal authentication when a first start condition, such as a key input, is satisfied in an individual unidentified state, and then, when the personal authentication is successful, the state is switched to an individual identified state.

SUMMARY

However, even when the short-distance wireless communication is performed through the personal authentication, data may be stolen in the case where a malicious third party tampers an antenna to attach a device for tapping, and then a user uses the antenna without noticing the abnormal change.

Then, according to one or more embodiments of the present disclosure, there are provided novel and improved communication device and detection method capable of improving security without impairing the convenience of the proximity wireless communication system.

According to an embodiment of the present disclosure, there is provided a communication device including a measurement portion configured to measure a reflection coefficient of an antenna that performs proximity wireless communication, during transmission of a transmission signal by the antenna, and a judgment portion configured to judge whether a value of the reflection coefficient measured by the measurement portion changes exceeding a value of a reflection coefficient of the antenna in a normal state and a predetermined threshold value.

According to an embodiment of the present disclosure, there is provided a judgment method including measuring a reflection coefficient of an antenna that performs proximity wireless communication, during transmission of a transmission signal by the antenna, and judging whether a value of the reflection coefficient measured in the measurement step changes exceeding a value of a reflection coefficient of the antenna in a normal state and a predetermined threshold value.

As described above, according to one or more of embodiments of the present disclosure, novel and improved communication device and detection method capable of improving security without impairing the convenience of the proximity wireless communication system can be provided.

BRIEF DESCRIPTION OF THE DRAWINGS

FIG. 2 is an explanatory view illustrating a configuration example of a hybrid transformer 120 provided in a communication device 100a;

DETAILED DESCRIPTION OF THE EMBODIMENT

Figure 1:
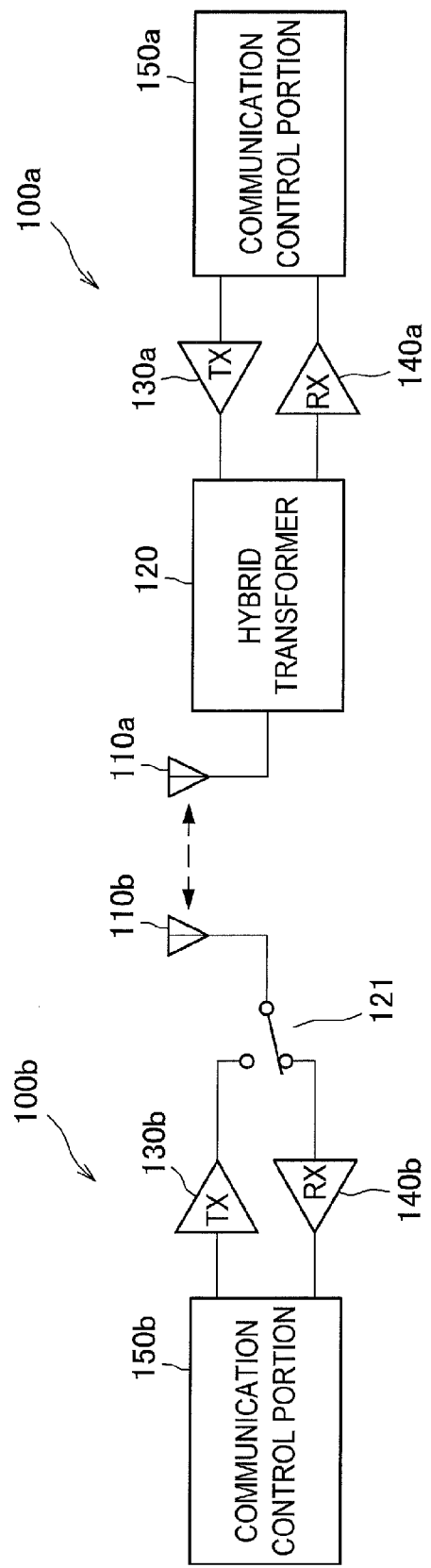
FIG. 1 is an explanatory view illustrating a configuration example of a communication system according to one embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description is given in the following order:
1. One embodiment of the present disclosure
Configuration example of communication system
Operation principle of hybrid transformer
Detailed configuration example of communication device
Operation example of communication device
2. Conclusion

1. ONE EMBODIMENT OF THE PRESENT DISCLOSURE

Configuration Example of Communication System

First, a configuration example of a communication system according to one embodiment of the present disclosure is described with reference to the drawings.

FIG. 1 is an explanatory view illustrating the configuration example of the communication system according to one embodiment of the present disclosure. Hereinafter, the configuration example of the communication system according to one embodiment of the present disclosure is described with reference to FIG. 1.

The communication system according to one embodiment of the present disclosure illustrated in FIG. 1 is a system which performs data communication by a proximity wireless communication method utilizing UWB. For a UWB short-distance high-speed wireless communication of the UWB, Transfer Jet may be used, for example. In the Transfer Jet, the same frequency band is used in transmission and reception. Specifically, in the Transfer Jet, 4.48 GHz carrier is adopted and proximity communication is performed at a transmission speed of 560 Mbps at the maximum. The details of the UWB short-distance high-speed wireless communication by the Transfer Jet are disclosed in Japanese Patent No. 4345849 already assigned to this applicant, http://www.transferjet.org/index.html, and the like, for example.

As illustrated in FIG. 1, the communication system according to one embodiment of the present disclosure is constituted by communication devices 100a and 100b. As an example, the communication devices 100a and 100b mutually perform proximity communication using 4.48 GHz carrier at a transmission speed of 560 Mbps at the maximum to perform data communication.

In the following description, it is described that the communication device 100a is a proximity wireless communication device on the transmission side (initiator side) of data transfer and it is described that the communication device 100b is a proximity wireless communication device on the receiving side (target side) of data transfer. The data transmitted from the communication device 100a may contain binary data, such as image data, music data, and text data, data for payment by electronic money, data for instrument setup, and the like, for example.

In the data transfer by the proximity wireless communication method utilizing UWB, the communication device 100a on the initiator side transmits a polling signal to the communication device 100b on the target side, and then the communication device 100b on the target side returns a response signal to the communication device 100a on the initiator side according to the polling signal. By a series of the signal exchanges, the communication device 100a on the initiator side and the communication device 100b on the target side can mutually judge the preparation situation for the proximity wireless communication or can synchronize the processing.

As illustrated in FIG. 1, the communication device 100a includes an antenna 110a, a hybrid transformer 120, a transmitter (TX) 130a, a receiver (RX) 140a, and a communication control portion 150a. The communication device 100b includes an antenna 110b, an antenna switch 121, a transmitter (TX) 130b, a receiver (RX) 140b, and a communication control portion 150b.

The antenna 110a of the communication device 100a has a high frequency coupler (induction electric field coupler) capable of mutually establishing electric field coupling with the antenna 110b of the communication device 100b. When the antenna 110a and the antenna 110b come close to each other until the distance therebetween is less than a predetermined distance (for example, come close to each other until the distance therebetween is about 2 to 3 cm), one antenna (for example, antenna 110b) detects changes in the induction field generated by the other antenna (for example, antenna 110a). As a result, one-to-one electric field communication between the communication device 100a and the communication device 100b is realized.

The hybrid transformer 120 of the communication device 100a prevents detour of a signal between the transmitter 130a and the receiver 140a. Due to the fact that the hybrid transformer 120 is provided, the communication device 100a can use the antenna 110a for both transmission and reception. The operation principle of the hybrid transformer 120 is described in detail later.

The switch 121 is a switch for connecting the antenna 110b to only either one of the transmitter 130b or the receiver 140b. For example, the switch 121 performs switching operation of connecting the antenna 110b to only either one of the transmitter 130b or the receiver 140b by the control of the communication control portion 150b.

The transmitter 130a generates a transmission signal to be transmitted to the communication device 100b from the antenna 110a. The transmitter 130a may include an encoder of encoding transmission data, a diffuser of diffusing the transmission data, a mapper of extending the transmission data from a binary series to a complex number signal, an RF circuit of performing up-conversion to a center frequency, and the like, for example. The transmitter 130b similarly generates a transmission signal to be transmitted to the communication device 100a from the antenna 110b.

The receiver 140a decodes a reception signal received by the antenna 110a. The receiver 140a may include an RF circuit to which the reception signal is input, a demapper of performing demapping of the reception signal, a decoder, and the like, for example. The receiver 140b similarly decodes the reception signal received by the antenna 110b.

The communication control portion 150a of the communication device 100a controls the generation of the transmission signal to be transmitted from the communication device 100a and the decoding of the reception signal to be received by the communication device 100a. The communication control portion 150b of the communication device 100b similarly controls the generation of the transmission signal to be transmitted from the communication device 100b and the decoding of the reception signal to be received by the communication device 100b.

Then, when a transmission signal is transmitted from the communication device 100a, the communication control portion 150a of the communication device 100a measures the reflection coefficient using a signal to be reflected from the antenna 110a. Then, the communication control portion 150a judges whether the measured reflection coefficient changes exceeding a value in the normal state measured beforehand and the predetermined threshold value.

The communication control portion 150a finds the presence of a device which attempts to perform proximity wireless communication besides the communication device 100b based on whether the reflection coefficient measured in the communication changes exceeding the value in the normal state and the predetermined threshold value. Then, when there is a device which attempts to perform proximity wireless communication besides the communication device 100b, the communication control portion 150a can judge that the device attempts to intercept the communication to unduly obtain data, and then can stop the transmission of the transmission signal from the antenna 110a.

Herein, in this embodiment, the normal state refers to a case where proximity wireless communication is performed by only the communication device 100a and the communication device 100b.

For example, in a case where the antenna 110a and the antenna 110b are close to each other all the times, the normal state refers to a case where proximity wireless communication is performed by only the antenna 110a and the antenna 110b. More specifically, the communication control portion 150a holds the reflection coefficient in the state where the antenna 110a and the antenna 110b are close to each other.

Then, the communication control portion 150a measures the reflection coefficient when proximity wireless communication is performed in the state where the antenna 110a and the antenna 110b are close to each other. Then, unless the reflection coefficient changes exceeding the value in the normal state and the predetermined threshold value, the communication control portion 150a may judge that there is no device which attempts to perform proximity wireless communication besides the communication device 100b.

Moreover, for example, in a case where the antenna 110a and the antenna 110b are close to each other only when proximity wireless communication is performed, the normal state refers to a case where proximity wireless communication is performed by only the antenna 110a and the antenna 110b. More specifically, the communication control portion 150a holds the reflection coefficient in the state where the antenna 110a and the antenna 110b come close to each other, and then proximity wireless communication is performed.

Then, the communication control portion 150a measures the reflection coefficient when the antenna 110a and the antenna 110b come close to each other, and then proximity wireless communication is performed. Then, unless the reflection coefficient changes exceeding the value in the normal state and the predetermined threshold value, the communication control portion 150a may judge that there is no device which attempts to perform proximity wireless communication besides the communication device 100b.

Moreover, for example, in a case where the antenna 110a and the antenna 110b are close to each other only when proximity wireless communication is performed, the normal state may refer to a case where the antenna 110a and the antenna 110b are not close to each other. More specifically, the communication control portion 150a holds the reflection coefficient in the state where the antenna 110a and the antenna 110b are not close to each other.

Then, the communication control portion 150a measures the reflection coefficient when the antenna 110a and the antenna 110b come close to each other, and then proximity wireless communication is performed. Then, unless the reflection coefficient changes exceeding the value in the normal state and the predetermined threshold value, the communication control portion 150a may judge that there is no device which attempts to perform proximity wireless communication besides the communication device 100b.

As described above, the configuration example of the communication system according to one embodiment of the present disclosure is described with reference to FIG. 1. Next, the operation principle of the hybrid transformer 120 is described.

Operation Principle of Hybrid Transformer

Figure 2:
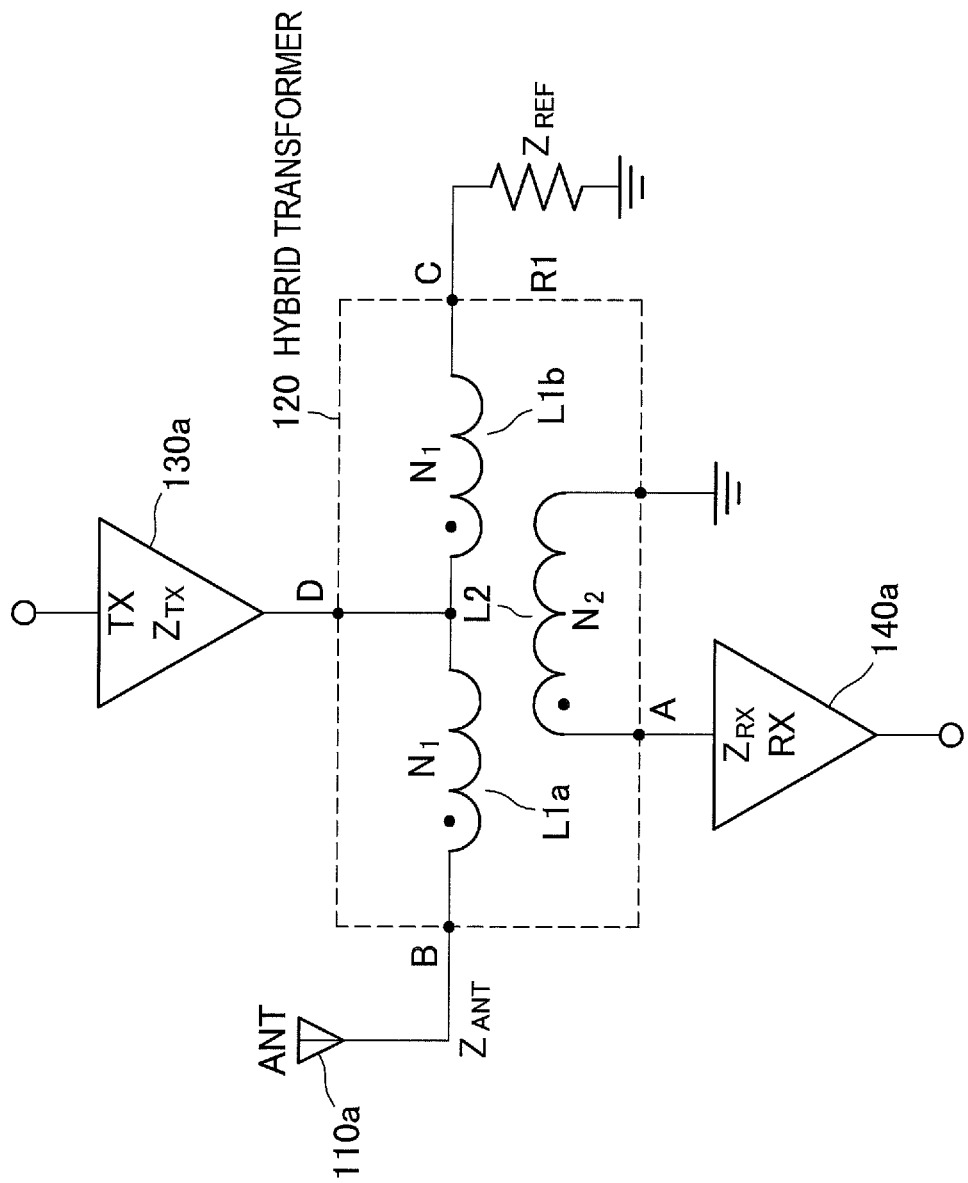

FIG. 2 is an explanatory view illustrating a configuration example of the hybrid transformer 120 to be provided in the communication device 100a. FIG. 2 also illustrates the antenna 110a, the transmitter 130a, and the receiver 140a in addition to the hybrid transformer 120. Hereinafter, the operation principle of the hybrid transformer 120 to be provided in the communication device 100a is described with reference to FIG. 2.

The hybrid transformer 120 contains coils L1a, L1b, and L2 as illustrated in FIG. 2. Both the coils L1a and L1b are coils whose number of turns is $N_1$ and the coil L2 is a coil whose number of turns is $N_2$.

To the terminal A of the hybrid transformer 120, the receiver 140a is connected. The input impedance of the receiver 140a is $Z_{RX}$. To a terminal B of the hybrid transformer 120, the antenna 110a is connected. The impedance of the antenna 110a is $Z_{ANT}$. To a terminal C of the hybrid transformer 120, a resistance R1 with an impedance of $Z_{REF}$ is connected. To a terminal D of the hybrid transformer 120, the transmitter 130a with an impedance of $Z_{TX}$ is connected. The impedance $Z_{REF}$ of the resistance R1 is a reference impedance.

More specifically, $N_1$ indicates the number of turns of the coil L1a between the terminals B and D and the number of turns of the coil L1b between the terminals D and C.

When the following expression 1 is satisfied, a transmission signal from the transmitter 130a is not transmitted to the receiver 140a and is transmitted only to the antenna 110a and the resistance R1.

$$Z_{ANT} = Z_{REF} \quad \text{(Expression 1)}$$

Moreover, when the relationships of the following expression 2 and the expression 3 are established, a reception signal to the receiver 140a is not transmitted to the resistance R1 and is transmitted only to the transmitter 130a and the receiver 140a.

$$Z_{TX} = \frac{Z_{REF}}{2} \quad \text{(Expression 2)}$$

$$Z_{RX} = \left(\frac{N_2}{N_1}\right)^2 \frac{Z_{REF}}{2} \quad \text{(Expression 3)}$$

Since the hybrid transformer 120 has such properties, the antenna 110a can be used as an antenna duplexer to be used for both transmission and reception. Therefore, the hybrid transformer 120 of the communication device 100a may function as an example of a separation portion of the present disclosure. The operation principle of a common hybrid transformer is also disclosed in, for example, "E. Sartori, "Hybrid Transformers," IEEE Trans. of Parts, Materials and Packaging, vol. 4, no. 3, pp. 59-66, 1968".

Figure 3:
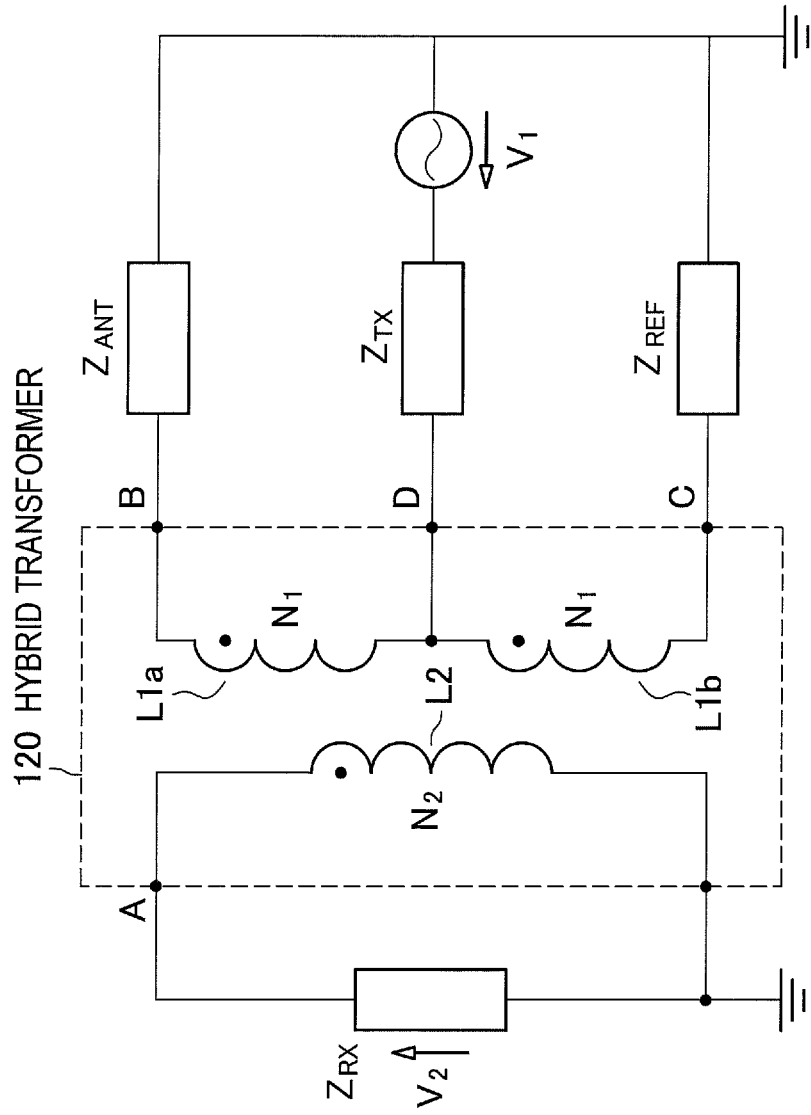
FIG. 3 is an explanatory view illustrating a circuit in which an antenna 110a, a transmitter 130a, and a receiver 140a connected to each terminal of the hybrid transformer 120 each are replaced with a terminal impedance.

FIG. 3 is an explanatory view illustrating a circuit in which the antenna 110a, the transmitter 130a, and the receiver 140a connected to each terminal of the hybrid transformer 120 illustrated in FIG. 2 each are replaced with a terminal impedance.

In the circuit illustrated in FIG. 3, $V_1$ is an open output voltage of the transmitter 130a and $V_2$ is input voltage which appears in the input of the receiver 140a when the open output voltage $V_1$ of the transmitter 130a is applied to the hybrid transformer 120.

Between the open output voltage $V_1$ and the input voltage $V_2$ of the transmitter 130a, the relationship of the following expression 4 is established.

$$\frac{V_2}{V_1} = \frac{1}{4} \cdot \frac{N_2}{N_1} \cdot \frac{Z_{ANT} - Z_{REF}}{Z_{ANT} + Z_{REF}} \quad \text{(Expression 4)}$$

The third term on the right side in Expression 4 is the reflection coefficient $\Gamma_{ANT}$ which is determined based on the relationship between the antenna impedance $Z_{ANT}$ and the reference impedance $Z_{REF}$. Therefore, by the use of the input voltage $V_2$ of the receiver 140a and the following expression 5, the reflection coefficient $\Gamma_{ANT}$ of the antenna 110a can be measured.

$$\Gamma_{ANT} = 4 \cdot \frac{N_1}{N_2} \cdot \frac{V_2}{V_1} \quad \text{(Expression 5)}$$

The third term on the right side in Expression 4 is the reflection coefficient $\Gamma_{ANT}$ which is determined based on the relationship between the antenna impedance $Z_{ANT}$ and the reference impedance $Z_{REF}$. Therefore, by the use of the input voltage $V_2$ of the receiver 140a and the following expression 5, the reflection coefficient $\Gamma_{ANT}$ of the antenna 110a can be measured.

$$\Gamma_{ANT} = 4 \cdot \frac{N_1}{N_2} \cdot \frac{V_2}{V_1} \quad \text{(Expression 5)}$$

The open output voltage $V_1$ of the transmitter 130a in proximity wireless communication using a weak electric wave is as low as several millivolts and the input voltage $V_2$ of the receiver 140a is a minute value of about tens of microvolts to 100 microvolts. Therefore, when measuring the reflection coefficient of the antenna 110a, it is desirable to amplify a reception signal using the receiver 140a, and then measure the same by a baseband physical layer. The open output voltage $V_1$ of the transmitter 130a in proximity wireless communication using a weak electric wave is as low as several millivolts and the input voltage $V_2$ of the receiver 140a is a minute value of about tens of microvolts to 100 microvolts. Therefore, when measuring the reflection coefficient of the antenna 110a, it is desirable to amplify a reception signal using the receiver 140a, and then measure the same by a baseband physical layer.

Figure 4:
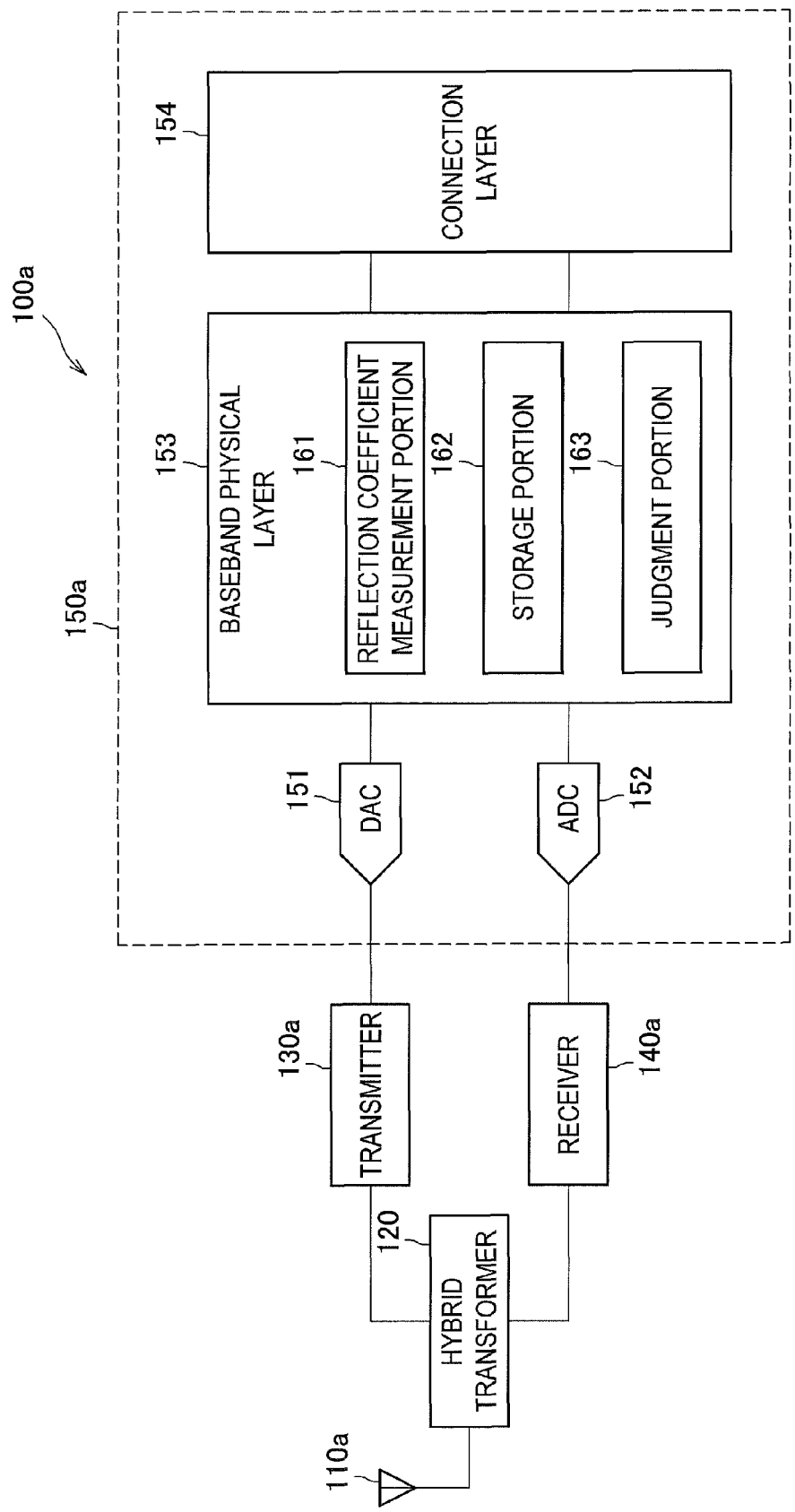
FIG. 4 is an explanatory view illustrating a configuration example of the communication device 100a according to one embodiment of the present disclosure.

As described above, the operation principle of the hybrid transformer 120 is described. Then, a configuration example of the communication device 100a according to one embodiment of the present disclosure is described in more detail.
Detailed Configuration Example of Communication Device FIG. 4 is an explanatory view illustrating a configuration example of the communication device 100a according to one embodiment of the present disclosure and illustrates the configuration of the communication control portion 150a in more detail. Hereinafter, the configuration example of the communication device 100a according to one embodiment of the present disclosure is described in more detail with reference to FIG. 4.

As illustrated in FIG. 4, the communication control portion 150a contained in the communication device 100a according to one embodiment of the present disclosure includes a DA converter (DAC) 151, an AD converter (ADC) 152, a baseband physical layer (PHY) 153, and a connection layer (CNL) 154.

The DA converter 151 converts a digital transmission signal generated in the baseband physical layer 153 to an analog transmission signal, and then outputs the analog transmission signal to the transmitter 130a. The AD converter 152 converts an analog reception signal supplied from the receiver 140 to a digital reception signal, and then supplies the digital reception signal to the baseband physical layer 153.

The baseband physical layer 153 includes a reflection coefficient measurement portion 161, a storage portion 162, and a judgment portion 163.

The reflection coefficient measurement portion 161 measures the reflection coefficient of the antenna 110a. Since the reflection coefficient $\Gamma_{ANT}$ of the antenna 110a can be calculated by Expression 5 above, the reflection coefficient measurement portion 161 measures the reflection coefficient of the antenna 110a using the digital reception signal supplied from the AD converter 152.

The storage portion 162 can store various data and, in this embodiment, stores the reflection coefficient $\Gamma_{ANT}$ of the antenna 110a in the normal state. The reflection coefficient $\Gamma_{ANT}$ of the antenna 110a in the normal state stored in the storage portion 162 is used for judgment processing in the judgment portion 163.

The judgment portion 163 judges whether another antenna is inserted between the communication device 100a and the communication device 100b based on the reflection coefficient $\Gamma_{ANT}$ of the antenna 110a measured by the reflection coefficient measurement portion 161 and the reflection coefficient $\Gamma_{ANT}$ of the antenna 110a in the normal state stored in the storage portion 162.

Specifically, when the reflection coefficient $\Gamma_{ANT}$ of the antenna 110a measured by the reflection coefficient measurement portion 161 is different from the reflection coefficient $\Gamma_{ANT}$ of the antenna 110a in the normal state stored in the storage portion 162 and exceeds the predetermined threshold value, the judgment portion 163 judges that another antenna is inserted between the communication device 100a and the communication device 100b.

The connection layer 154 manages connection and data distribution. In the management of the connection, the connection layer 154 establishes the connection with a device of a communication partner apparatus and disconnects the established connection. In this embodiment, when it is judged that another antenna is inserted between the communication device 100a and the communication device 100b by the judgment portion 163, the connection layer 154 disconnects communication with the communication device 100b.

Due to the fact that the communication device 100a according to one embodiment of the present disclosure has such a configuration, the communication device 100a according to one embodiment of the present disclosure finds the presence of a device which attempts to perform proximity wireless communication besides the communication device 100b. Then, when there is a device which attempts to perform proximity wireless communication besides communication device 100b, the communication control portion 150a can judge that that the device attempts to intercept the communication to unduly obtain data, and then can stop the transmission of the transmission signal from the antenna 110a.

As described above, the configuration example of the communication device 100a according to one embodiment of the present disclosure with reference to FIG. 4 is described. Then, an operation example of the communication device 100a according to one embodiment of the present disclosure is described.

Operation Example of Communication Device

Figure 5:
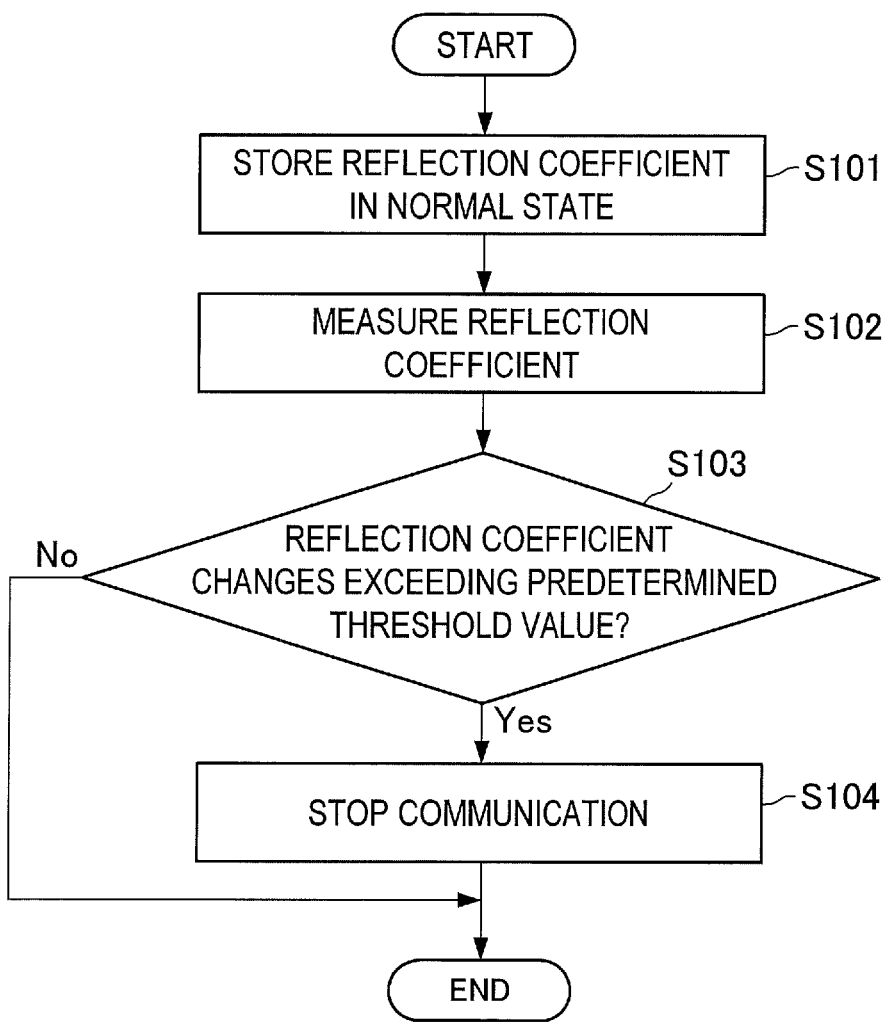
FIG. 5 is a flow chart illustrating an operation example of the communication device 100a according to one embodiment of the present disclosure.

FIG. 5 is a flow chart illustrating an operation example of the communication device 100a according to one embodiment of the present disclosure. The flow chart illustrated in FIG. 5 is an operation example when the reflection coefficient $\Gamma_{ANT}$ of the antenna 110a is measured, and then it is judged whether another antenna is inserted between the communication device 100a and the communication device 100b. Hereinafter, the operation example of the communication device 100a according to one embodiment of the present disclosure is described with reference to FIG. 5.

The communication device 100a first measures the reflection coefficient $\Gamma_{ANT}$ of the antenna 110a in the normal state, and then stores the value (Step S101). The measurement of the reflection coefficient $\Gamma_{ANT}$ of the antenna 110a in the normal state is performed by the reflection coefficient measurement portion 161. The reflection coefficient measurement portion 161 stores the measured reflection coefficient $\Gamma_{ANT}$ in the storage portion 162.

Herein, when measuring reflection coefficient $\Gamma_{ANT}$ of the antenna 110a in the normal state, the reflection coefficient measurement portion 161 may determine the same using the expression above but can also determine the same from the signal flow graph represented using a 2-port S-parameter between the antennas 110a and 110b and a reflection coefficient $\Gamma_L$ of the communication device 100b on the receiving side.

Figure 6:
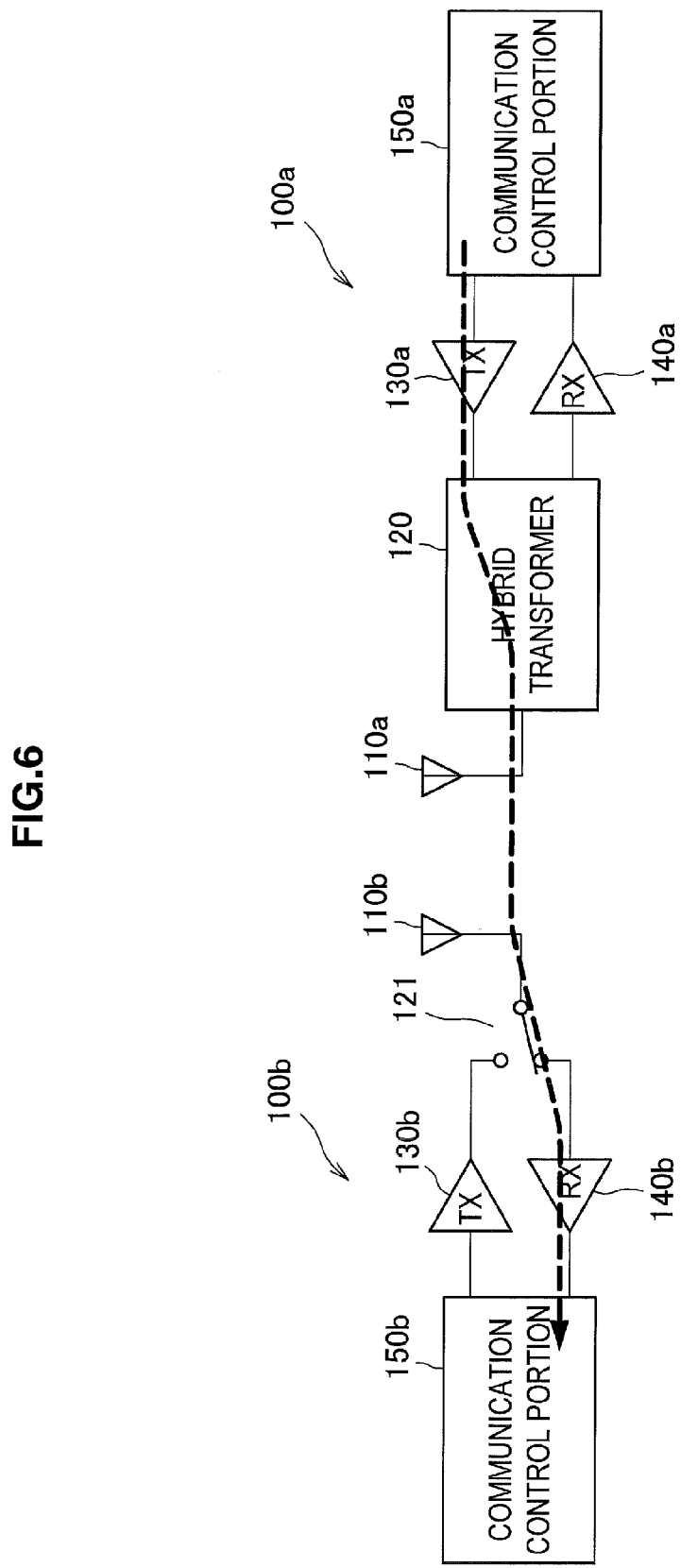
FIG. 6 is an explanatory view illustrating the usage state in the normal state of the communication device 100a and a communication device 100b.
Figure 7:
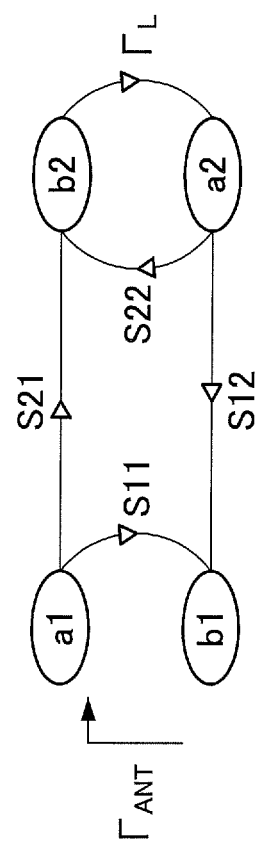
FIG. 7 is an explanatory view illustrating a signal flow graph in the state illustrated in FIG. 6.

FIG. 6 is an explanatory view illustrating the usage state in the normal state of the communication device 100a and the communication device 100b. FIG. 7 is an explanatory view illustrating a signal flow graph in the state illustrated in FIG. 6. The arrow indicated in FIG. 6 schematically illustrates the flow of a signal from the communication device 100a to the communication device 100b.

From the signal flow graph illustrated in FIG. 7, the reflection coefficient $\Gamma_{ANT}$ of the antenna 110a in the normal state is calculated as in the following expression 6.

$$\Gamma_{ANT} = S11 + \frac{S12 \cdot S21 \cdot \Gamma_L}{1 - S22 \cdot \Gamma_L} \quad \text{(Expression 6)}$$

The derivation of Expression 6 is performed as follows. Between b1 and b2 of FIG. 7, the following relationship is established.

$$b1 = S11 \times a1 + S12 \times a2$$

$$b2 = S21 \times a1 + S22 \times a2$$

From the reflection coefficient $\Gamma_L$ of the communication device 100b, the relationship of $a2 = \Gamma_L \times b2$ is established. Therefore, b2 is $b2 = S21 \times a1 / (1 - S22 \times \Gamma_L)$.

$$b1 \text{ is } b1 = a1 \times S11 + a1 \times S21 \times S12 \times \Gamma_L / (1 - S22 \times \Gamma_L)$$

$$= a1 \times (S11 + S21 \times S12 \times \Gamma_L / (1 - S22 \times \Gamma_L)).$$

Thus, since the reflection coefficient $\Gamma_{ANT}$ of the antenna 110a is $\Gamma_{ANT} = b1/a1$, the relationship of Expression 6 above is established.

When $\Gamma_L = 1$ is substituted into the reflection coefficient $\Gamma_{ANT}$ of the antenna 110a in the normal state shown by Expression 6 above, the case is equivalent to a case where the antenna 110b does not present. Therefore, the reflection coefficient $\Gamma_{ANT}$ of the antenna 110a when 1 is substituted into $\Gamma_L$ of Expression 6 may be the reflection coefficient $\Gamma_{ANT}$ of the antenna 110a in the normal state.

The communication device 100a measures the reflection coefficient $\Gamma_{ANT}$ of the antenna 110a in the normal state, stores the value, and then measures the reflection coefficient $\Gamma_{ANT}$ of the antenna 110a in the normal state in the communication with the communication device 100b (Step S102). The measurement of the reflection coefficient $\Gamma_{ANT}$ of the antenna 110a in this step S102 is performed by the reflection coefficient measurement portion 161.

When the measurement of the reflection coefficient $\Gamma_{ANT}$ in this step S102 is performed by the reflection coefficient measurement portion 161 in the same state as the state illustrated in FIG. 6, the value to be obtained is not different from the value stored in Step S101 or, even if the value changes, the change is within tolerance. However, when the measurement of the reflection coefficient $\Gamma_{ANT}$ in this step S102 is performed by the reflection coefficient measurement portion 161 in a state different from the state illustrated in FIG. 6, i.e., a state where another antenna is present between the communication devices 100a and 100b, the value to be obtained is clearly different from the value stored in Step S101.

Figure 8:
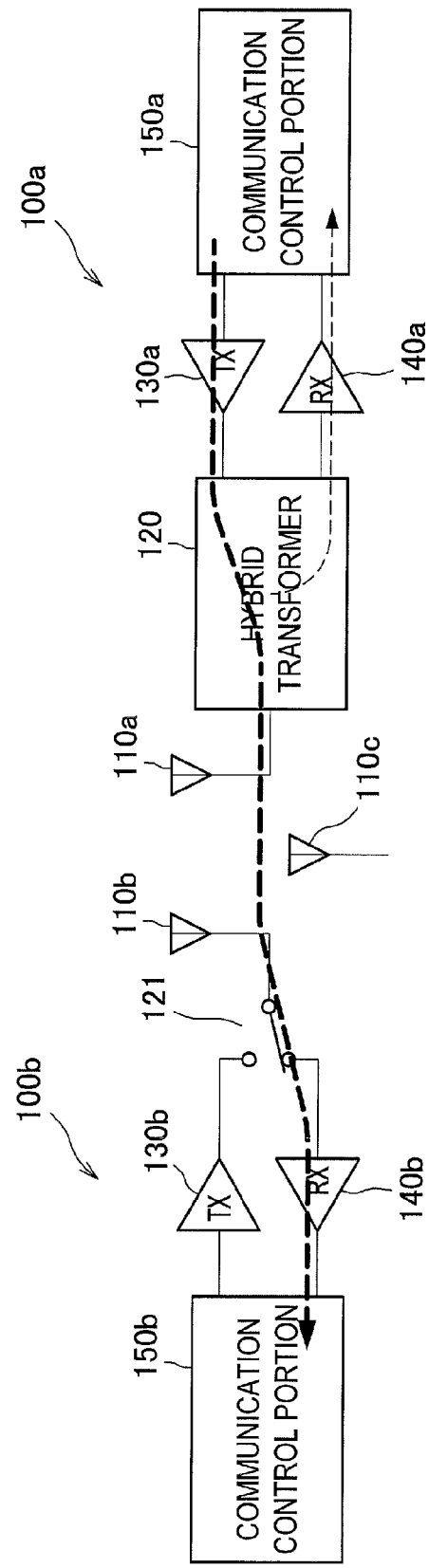
FIG. 8 is an explanatory view illustrating a usage state different from the usage state in the normal state of the communication devices 100a and 100b.
Figure 9:
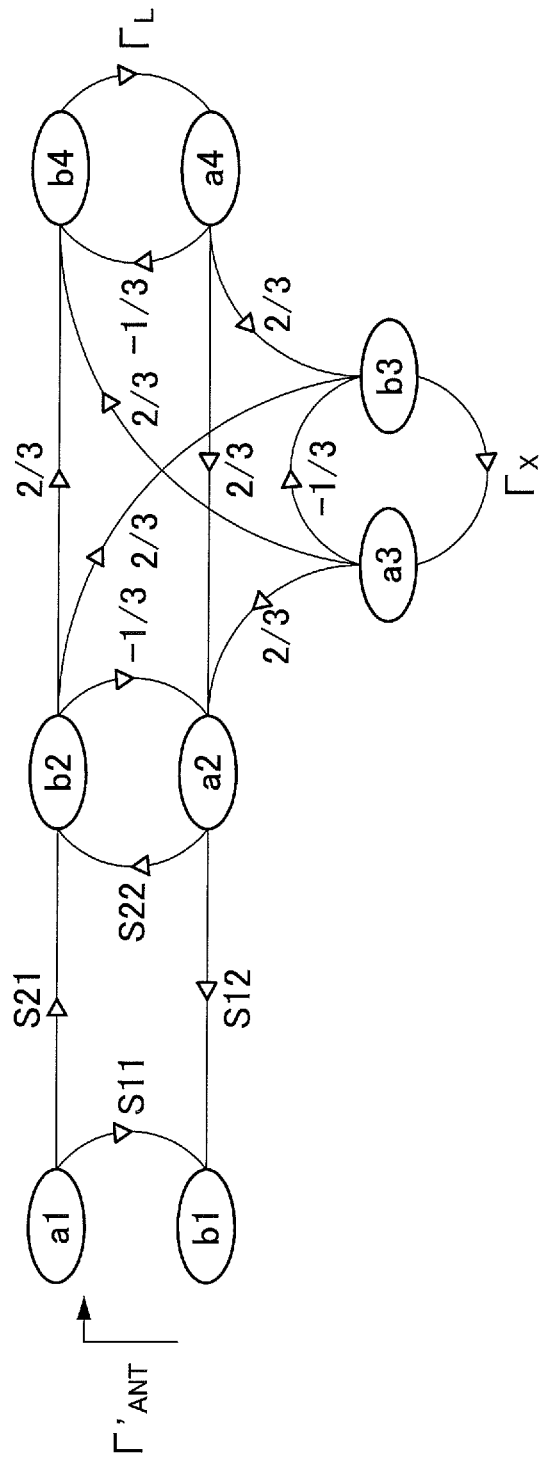
FIG. 9 is an explanatory view illustrating a signal flow graph in the state illustrated in FIG. 8.

FIG. 8 is an explanatory view illustrating a usage state different from that in the normal state of the communication devices 100a and 100b. FIG. 9 is an explanatory view illustrating the signal flow graph in the state illustrated in FIG. 8. FIG. 8 illustrates an antenna 110c installed by a third party. The antenna 110c is an antenna which performs communication with 4.48 GHz carrier similarly as in the antenna 110a and the 110b. The arrow indicated in FIG. 8 schematically illustrates the flow of a signal from the communication device 100a to the communication device 100b and illustrates a state where the reflection coefficient $\Gamma_{ANT}$ is varied by the antennas 110c. The signal flow graph illustrated in FIG. 9 is an example of the signal flow graph when the antenna 110c which is not intended is inserted between the communication devices 100a and 100b.

As described above, the data to be transmitted from the communication device 100a may contain binary data, such as image data, music data, and text data, data for payment by electronic money, data for instrument setup, and the like, for example. Therefore, a situation in which such data leak through the antenna 110c installed by a third party is to be prevented.

From the signal flow graph illustrated in FIG. 9, the reflection coefficient $\Gamma'_{ANT}$ of the antenna 110a in the state of FIG. 8 is determined as in the following expression 7.

$$\Gamma'_{ANT} = S11 + \frac{S12 \cdot S21 \cdot \left( \frac{\Gamma_X + \Gamma_L + 3\Gamma_X \Gamma_L - 1}{\Gamma_X + \Gamma_L - \Gamma_X \Gamma_L + 3} \right)}{1 - S22 \cdot \left( \frac{\Gamma_X + \Gamma_L + 3\Gamma_X \Gamma_L - 1}{\Gamma_X + \Gamma_L - \Gamma_X \Gamma_L + 3} \right)} \quad \text{(Expression 7)}$$

When the reflection coefficient $\Gamma'_{ANT}$ of the antenna 110a in this state of FIG. 8 changes exceeding the reflection coefficient $\Gamma_{ANT}$ of the antenna 110a in the normal state and a predetermined threshold value, the communication device 100a can judge that another antenna is present between the communication devices 100a and 100b. Therefore, the communication device 100a compares the reflection coefficient $\Gamma_{ANT}$ of the antenna 110a stored in Step S101 with the reflection coefficient $\Gamma'_{ANT}$ of the antenna 110a determined in Step S102, and then judge whether both the values change exceeding the predetermined threshold value (Step S103). The judgment is performed by the judgment portion 163.

The judgment portion 163 may judge based on whether the change exceeding the predetermined threshold value is a temporary change or a continuous change. More specifically, even in a case where the antenna 110c is not present, when the communication device 100b is not held over an intended position, there is a possibility that the reflection coefficient $\Gamma_{ANT}$ of the antenna 110a stored in Step S101 and the reflection coefficient $\Gamma'_{ANT}$ of the antenna 110a determined in Step S102 may change exceeding the predetermined threshold value. However, when the change is a transient change, the judgment portion 163 can judge that the values change exceeding the predetermined threshold value because the communication device 100b is not held over the intended position.

On the other hand, when the change exceeding the predetermined threshold value repeatedly occurs or continues, the judgment portion 163 can judge that the antenna 110c is installed by a third party.

When the reflection coefficient $\Gamma_{ANT}$ of the antenna 110a stored in Step S101 and the reflection coefficient $\Gamma'_{ANT}$ of the antenna 110a determined in Step S102 change exceeding the predetermined threshold value as a result of the judgment of Step S103, the communication device 100a judges that another antenna is present between the communication devices 100a and 100b, and then stops the communication with the communication device 100b (Step S104). The stop of the communication can be carried out by the connection layer 154.

On the other hand, when the reflection coefficient $\Gamma_{ANT}$ of the antenna 110a stored in Step S101 and the reflection coefficient $\Gamma'_{ANT}$ of the antenna 110a determined in Step S102 do not change exceeding the predetermined threshold value as a result of the judgment of Step S103, the communication device 100a judges that another antenna is not present between the communication devices 100a and 100b, and then continues the communication with the communication device 100b.

The communication device 100a according to one embodiment of the present disclosure can judge whether another antenna is present between the communication devices 100a and 100b based on the changes in the reflection coefficient by carrying out the operation as illustrated in FIG. 5. Then, when the communication device 100a according to one embodiment of the present disclosure judges that another antenna is present between the communication devices 100a and 100b, the communication device 100a can judge that the antenna attempts to unjustly obtain data, and then stop the communication with the communication device 100b.

2. CONCLUSION

As described above, according to one embodiment of the present disclosure, the communication device 100a capable of detecting the presence of foreign substances, such as an antenna, which are not intended by holding the reflection coefficient of the antenna 110a in the normal state beforehand, and then comparing the reflection coefficient of the antenna 110a in the normal state with the reflection coefficient of the antenna 110a in the communication is provided.

The communication device 100a according to one embodiment of the present disclosure can judge whether another antenna is present between the communication devices 100a and 100b based on the changes in the reflection coefficient. Then, when the communication device 100a according to one embodiment of the present disclosure judges that another antenna is present between the communication devices 100a and 100b, the communication device 100a can judge that the antenna attempts to unjustly obtain data, and then stop the communication with the communication device 100b.

In this specification, the system means a set of a plurality of constituent elements (devices, modules (parts), and the like) and all the constituent elements may or may not be contained in the same case. Therefore, both a plurality of devices which are stored in separate cases and are connected through a network and one device in which a plurality of modules are stored in one case fall under the category of the system.

Each step in the processing carried out by each device of this specification does not necessarily have to be performed in a time series manner in accordance with the order indicated as a sequence diagram or a flow chart. For example, each step in the processing performed by each device may be processed in an order different from the order indicated as a flow chart or may be processed in parallel. When a plurality of processing steps are included in one step, the plurality of processing steps included in the one step can be performed by one device or can also be shared by a plurality of devices.

Moreover, a computer program which allows hardware, such as CPU, ROM, and RAM, built in each device to demonstrate a function equivalent to that of the configuration of each device described above can also be created. Moreover, a storage medium in which the computer program is stored can also be provided. Moreover, by constituting each functional block shown in the functional block diagram by hardware, a series of processing steps can also be realized by the hardware.

As described above, a suitable embodiment of the present disclosure is described in detail with reference to the attached drawings but the present disclosure is not limited to this example. It is clear that various modifications and alterations are easily conceived by a person having ordinary skill in the art to which the present disclosure pertains within the scope of the technical idea described in claims and it should be understood that the examples are to be included in the technical scope of the present disclosure.

For example, the above-described embodiment describes the configuration in which the hybrid transformer is provided in order to prevent mixture of a transmission signal and a reception signal in the communication device 100a but the present disclosure is not limited to the example. For example, a directional coupler may be provided in place of the hybrid transformer. When the directional coupler is used for the communication device 100a, the communication device 100a may measure the reflection coefficient of the antenna 110a using a voltage standing wave ratio (VSWR).

Additionally, the present technology may also be configured as below:

(1) A communication device including:

a measurement portion configured to measure a reflection coefficient of an antenna that performs proximity wireless communication, during transmission of a transmission signal by the antenna; and a judgment portion configured to judge whether a value of the reflection coefficient measured by the measurement portion changes exceeding a value of a reflection coefficient of the antenna in a normal state and a predetermined threshold value.

(2) The communication device according to (1), wherein the judgment portion performs the judgment, based on the reflection coefficient of the antenna when a state where a communication partner of the antenna to be assumed is not present is defined as the normal state.

(3) The communication device according to (1) or (2), wherein
the judgment portion performs the judgment, based on the reflection coefficient of the antenna when a state where a communication partner of the antenna to be assumed is present is defined as the normal state.

(4) The communication device according to any one of (1) to (3), further including:
a communication control portion configured to stop the transmission of the transmission signal from the antenna when the value of the reflection coefficient measured by the measurement portion changes exceeding the value of the reflection coefficient of the antenna in the normal state and the predetermined threshold value as a result of the judgment of the judgment portion.

(5) The communication device according to any one of (1) to (4), further including:
a separation portion configured to separate the transmission signal to be transmitted from the antenna and a reception signal to be received by the antenna.

(6) The communication device according to (5), wherein
the separation portion is a hybrid transformer.

(7) The communication device according to any one of (1) to (6), wherein
a same frequency band is used in the transmission from the antenna and reception by the antenna.

(8) A judgment method including:
measuring a reflection coefficient of an antenna that performs proximity wireless communication, during transmission of a transmission signal by the antenna; and
judging whether a value of the reflection coefficient measured in the measurement step changes exceeding a value of a reflection coefficient of the antenna in a normal state and a predetermined threshold value.

What is claimed is:

1. A communication device comprising:
a measurement portion configured to measure a reflection coefficient of an antenna that performs proximity wireless communication, during transmission of a transmission signal by the antenna;
a judgment portion configured to judge whether a value of the reflection coefficient measured by the measurement portion changes exceeding a value of a reflection coefficient of the antenna in a normal state and a predetermined threshold value; and
a communication control portion configured to stop the transmission of the transmission signal from the antenna when the value of the reflection coefficient measured by the measurement portion changes exceeding the value of the reflection coefficient of the antenna in the normal state and the predetermined threshold value as a result of the judgment of the judgment portion.

2. The communication device according to claim 1, wherein the judgment portion performs the judgment, based on the reflection coefficient of the antenna when a state where a communication partner of the antenna to be assumed is not present is defined as the normal state.

3. The communication device according to claim 1, wherein the judgment portion performs the judgment, based on the reflection coefficient of the antenna when a state where a communication partner of the antenna to be assumed is present is defined as the normal state.

4. The communication device according to claim 1, further comprising:
a separation portion configured to separate the transmission signal to be transmitted from the antenna and a reception signal to be received by the antenna.

5. The communication device according to claim 4, wherein the separation portion is a hybrid transformer.

6. The communication device according to claim 1, wherein a same frequency band is used in the transmission from the antenna and reception by the antenna.

7. A judgment method comprising:
measuring a reflection coefficient of an antenna that performs proximity wireless communication, during transmission of a transmission signal by the antenna;
judging whether a value of the reflection coefficient measured in the measurement step changes exceeding a value of a reflection coefficient of the antenna in a normal state and a predetermined threshold value; and
stopping the transmission of the transmission signal from the antenna when the measured value of the reflection coefficient changes exceeding the value of the reflection coefficient of the antenna in the normal state and the predetermined threshold value as a result of the judgment of the judgment portion.

8. The judging method according to claim 7, further comprising:
performing the judgment based on the reflection coefficient of the antenna when a state where a communication partner of the antenna to be assumed is not present is defined as the normal state.

9. The judging method according to claim 7, further comprising:
performing the judgment based on the reflection coefficient of the antenna when a state where a communication partner of the antenna to be assumed is present is defined as the normal state.

10. The judging method according to claim 7, further comprising:
separating the transmission signal to be transmitted from the antenna and a reception signal to be received by the antenna.

11. The judging method according to claim 7, wherein
a same frequency band is used in the transmission from the antenna and reception by the antenna.

* * * * *